UNITED STATES PATENT OFFICE.

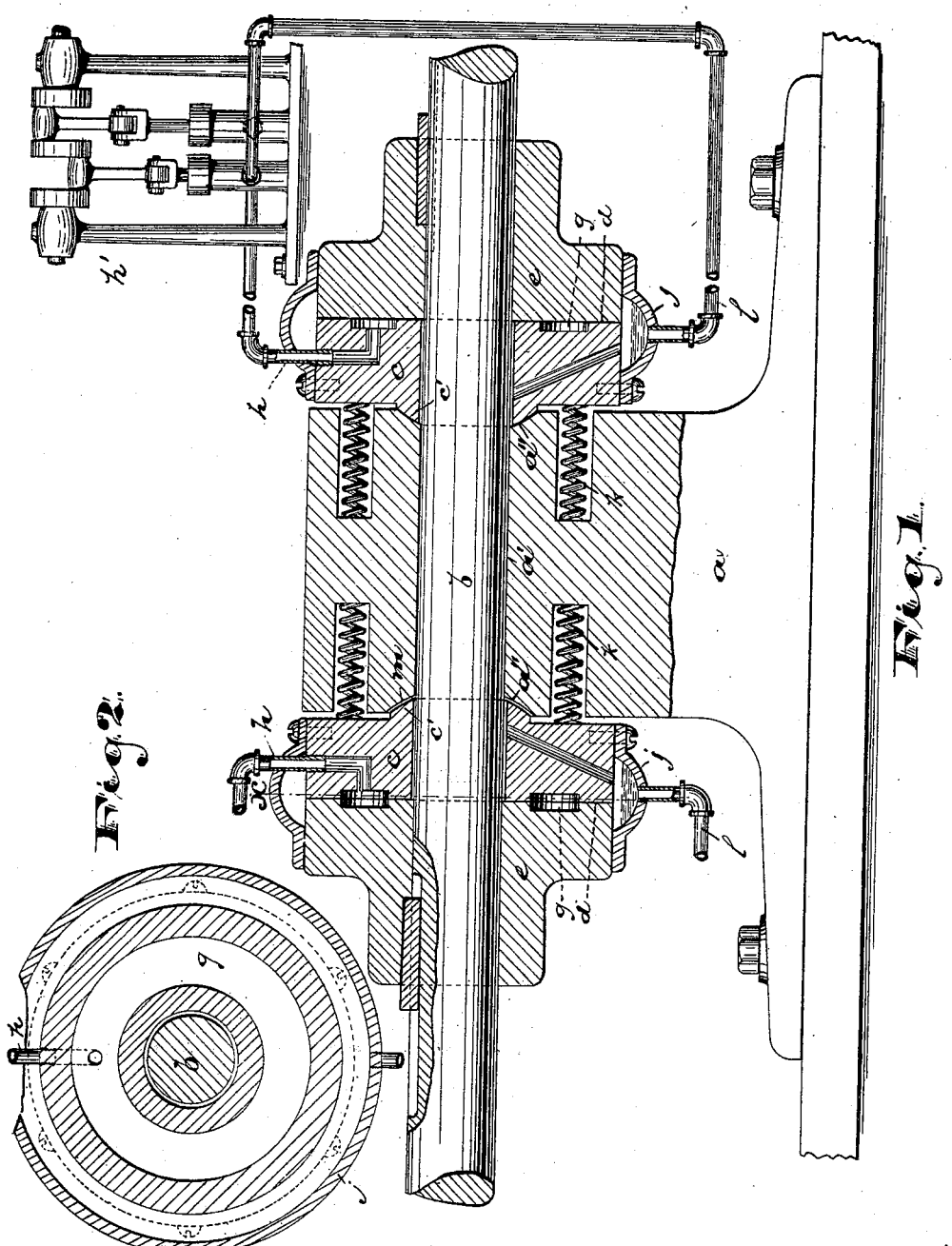

GEORGE E. WRIGHT, OF NEWARK, NEW JERSEY, ASSIGNOR OF ONE-HALF TO FRED C. SMITH, OF SAME PLACE.

THRUST-BEARING FOR SHAFTS.

SPECIFICATION forming part of Letters Patent No. 611,984, dated October 4, 1898.

Application filed November 20, 1897. Serial No. 659,345. (No model.)

*To all whom it may concern:*

Be it known that I, GEORGE E. WRIGHT, a citizen of the United States, residing at Newark, in the county of Essex and State of New Jersey, have invented certain new and useful Improvements in Thrust-Bearings for Shafts, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to reduce the friction due to the end thrust of a propeller-shaft or other power-transmitting devices and to thereby avoid or greatly reduce the loss of power due to such friction; to secure a more simple end bearing for said shaft, and thus to reduce the cost of construction and repairs and the trouble and loss incident to frequent repairing; to secure greater economy in the use of lubricants; to secure an end-thrust bearing that will accommodate itself automatically to the line of the shaft, and to secure other advantages and results, some of which may be referred to hereinafter in connection with the description of the working parts.

The invention consists in the improved end-thrust bearing for propeller-shafts, &c., and in the arrangements and combinations of parts of the same, all substantially as will be hereinafter set forth and finally embraced in the clauses of the claim.

Referring to the accompanying drawings, in which like letters of reference indicate corresponding parts in each of the views, Figure 1 is a sectional view taken through the axial center of the shaft, and Fig. 2 is a sectional view of one of the thrust plates or bearings on line $x$, Fig. 1.

In said drawings, $a$ indicates the main bracket or resistance-block, adapted to be firmly and securely fastened by bolts or other means to the framework of the vessel.

$b$ indicates the shaft, which is adapted to rotate in its bearings, the said shaft being provided at one end with a suitable propeller-wheel (not shown) or other weight or load adapted to produce a longitudinal thrust of the shaft on its end bearings. While said shaft may be horizontal and be employed with a propeller-wheel, it may be vertical and sustain a weight at the top or may be otherwise arranged to produce the end thrust referred to. Said bracket, preferably at opposite sides thereof and contiguous to the shaft-perforations $a'$, is provided with concavities $a'' a''$, in which are arranged the convexed projections $c' c'$ of thrust-plates $c$, said thrust-plates being disk-like plates of ample thickness to take the end thrust of the shaft $b$ without breaking or collapsing. The said plates $c$ automatically adjust themselves to the shaft and coöperating concavities and convexed projections. Upon the shaft are secured coöperating thrust-plates $e\,e$, which present flat smoothly-ground faces $d$ to the correspondingly-ground faces of the thrust-plates $c$. The flat meeting or contiguous surfaces of the parts $c\,e$ are broad to provide a proper engagement should the pump hereinafter referred to fail to force the lubricant, as will be described, and the joint formed by said flat meeting surface is open at its outer edge or periphery to permit a free outflow of the fluid. The opening in the joint between the ground faces is but very slight, so that a very thin film of lubricant may be forced between, and in the event of a failure of the forcing means to act properly there will be no appreciable collapse or disarrangement of the working parts tending to permanent damage of the motive mechanisms.

One or both of the thrust-plates, preferably the one bearing against the bracket $a$, is provided with an annular groove $g$ in its ground face. Said grooves, while preferably continuous, annular, or ring shape, may be discontinuous, or simple recesses may be formed in said faces, although I prefer the annular form, so as to obtain a more uniform lubrication. The said grooves are in open communication by a lubricant-supply pipe or pipes $h$ with a force pump or pumps, as $h'$. Said pump is also in communication by means of a pipe $h$ with an annular drip pan or receptacle $j$, arranged around or beneath the joint between the thrust-plates, so as to receive the drippings, the said pump receiving the oil or lubricant from the drip pan or receptacle and delivering the same under pressure to the annular groove $g$ or to the joint between the thrust-surfaces. The pressure of the lubricant is such as to force the joints between the thrust-plates open or to some extent apart, so that the friction of the thrust-plate $e$ movable with the shaft is avoided or greatly reduced, the pressure being brought upon the liquid alone as it flows under pressure of the pump.

I prefer to employ springs $k$ back of the stationary thrust-plate, so that when the shaft is reversed in its rotary movement and the thrust is in the opposite direction the springs will force the thrust-plate relieved of pressure against its coöperating thrust-plate to keep the joint more or less closed. In practice but a slight play is permitted to said plates, the space due to the action of the springs on the thrust-plate being indicated at $m$.

While the thrust-bearing thus described is useful particularly in connection with a propeller-wheel shaft for propelling vessels, I wish it to be understood that it may be employed in connection with elevating devices or other mechanism in which an end thrust is produced. I do not wish, therefore, to be understood as limiting myself to the exact arrangements shown, excepting as the state of the art may require.

Having thus described the invention, what I claim as new is—

1. The combination with a bracket or bearing-block bored to receive a shaft $b$, and at opposite sides having concavities $a''$, $a''$, thrust-plates arranged on said shaft and having projections to lie in said concavities, springs $k$, inserted between said bearing-block and thrust-plates, coöperating thrust-plates also arranged on said shaft and fixed thereto, means for forcing lubricant between the faces of said thrust-plates, there being ducts leading from said pump to the joints between said thrust-plates, and means to receive the fluid lubricant as it issues from said joints, substantially as set forth.

2. In combination, the bracket $a$, thrust-plate $c$, shaft $b$, thrust-plate $e$, arranged on said shaft and forming an open joint with the thrust-plate $c$, a drip pan or receptacle adapted to receive the flow from said open joint and a pump in connection with both said open joint and drip-pan, substantially as set forth.

3. In combination with the concaved bracket and thrust-plate having a convexed projection bearing in said concavity, a shaft having a coöperating thrust-plate fixed thereon, said plates having a groove or chamber between, there being a duct or passage communicating with said groove or chamber, and a pump connecting therewith, a drip-pan outside of said plates and receiving the outflowing fluid, and a connection of said drip-pan with said pump, substantially as set forth.

4. In combination, the bracket or block, a thrust-plate having a convexed projection entering a concavity in said block, springs $k$, a shaft, and a thrust-plate thereon, there being ducts leading between said thrust-plates, and a pump, substantially as set forth.

In testimony that I claim the foregoing I have hereunto set my hand this 9th day of November, 1897.

GEORGE E. WRIGHT.

Witnesses:
CHARLES H. PELL,
C. B. PITNEY.